United States Patent
Chabin et al.

Patent Number: 5,427,636
Date of Patent: Jun. 27, 1995

[54] DEVICE FOR MEASURING THE TRAVELLING LENGTH OF A TREAD DURING ITS INSTALLATION ON A TIRE CASING, AND PROCEDURE OF THE USE THEREOF

[75] Inventors: Veronique Chabin, Angely; Armand Baccaud, Epoisses, both of France

[73] Assignee: Pneu Laurent, Avallon, France

[21] Appl. No.: 157,019

[22] PCT Filed: May 26, 1992

[86] PCT No.: PCT/FR92/00470

§ 371 Date: Dec. 6, 1993

§ 102(e) Date: Dec. 6, 1993

[87] PCT Pub. No.: WO92/21513

PCT Pub. Date: Dec. 10, 1992

[30] Foreign Application Priority Data

Jun. 5, 1991 [FR] France ............ 91 06843

[51] Int. Cl.⁶ ............ B29D 30/56
[52] U.S. Cl. ............ 156/64; 156/96; 156/130; 156/360; 156/405.1; 156/406.6; 156/909
[58] Field of Search ............ 156/96, 64, 405.1, 406.4, 156/406.6, 130, 128.6, 129, 358, 360

[56] References Cited

U.S. PATENT DOCUMENTS

| 1,315,981 | 9/1919 | Morton | 156/406.6 |
| 3,874,974 | 4/1975 | Simmons, Jr. | 156/406.4 |
| 5,292,398 | 3/1994 | Miyamoto et al. | 156/405.1 |

FOREIGN PATENT DOCUMENTS

| 2105765 | 8/1972 | Germany . | |
| 4108515 | 9/1991 | Germany . | |
| 880783 | 11/1981 | U.S.S.R. | 156/126 |

Primary Examiner—Geoffrey L. Knable
Attorney, Agent, or Firm—Oblon, Spivak, McClelland, Maier & Neustadt

[57] ABSTRACT

A process for recapping tires with a pre-molded, pre-vulcanized tread (2) uses a device for measurement of the travelling length of the tread (2). This device includes a stop (5) which moves on a guide track (6) connected to an endless notched belt (7) held in place by two pulleys (8) and (9), a motor (10), and an optical coder (11). During the entire installation phase of the tread (2) on the casing (21), the stop (5) generates a slight force on the free end of the tread placed on a preparation table (3) incorporating rollers (4).

5 Claims, 2 Drawing Sheets

DEVICE FOR MEASURING THE TRAVELLING LENGTH OF A TREAD DURING ITS INSTALLATION ON A TIRE CASING, AND PROCEDURE OF THE USE THEREOF

The present invention concerns the field of tire recapping for heavy vehicles, using pre-molded and pre-vulcanized treads. More specifically, it concerns a device for measuring the travelling length of the tread during its installation on a casing.

The process entailing recapping of a heavy-weight tire casing by installing a pre-molded, pre-vulcanized tread thereon is well known. After removing what remains of the used tread by machining the casing and putting in place a bonding layer, a new pre-molded, pre-vulcanized tread is put on the tire, followed by vulcanization of this bonding layer, performed, for instance, in an autoclave, this process being designed to ensure the adhesion between the new tread and the casing. It is sometimes necessary to also replace one or several top-reinforcement plies.

To properly assemble the new tread to the casing, the tread length must be slightly shorter than that of the circumference of the casing, and must thus be elongated when it is put on.

Another problem is linked to the use of pre-molded treads incorporating a tread-design spacing. It is desirable that this spacing be taken into account at the point where the two ends of the tread are joined on the casing, so as to prevent defects of uniformity of dynamic performance of the recapped tire.

A conventional procedure for installing a tread on a casing consists in controlling the elongation of the tread when it is placed on the casing as a function of the difference between the measurement of the length of the arc of the casing upon which the tread has been applied and the measurement of the length of the finished tread. This limitation of elongation is intended to allow uniform placement of the tread on the casing with an average elongation initially provided for, so as to achieve, at the end of the installation procedure, a satisfactory connection of the two ends of the tread, while adhering to the tread-design spacing.

These two measurements both relate to the same quantity of material, i.e., the portion of the tread placed on the casing, but to a material not in the same state of deformation. In fact, the arc of the casing at the point where the tread is completed relates to a material which is elongated during its installation; the completed length refers to the original length of the tread in the resting state, i.e., in its non-deformed condition. The variation of the elongation of the treads is produced by a press-roller actuated by a jack. The measurement of the tread arc makes use of an optical coder attached to the drive shaft of the chuck on which the casing is mounted. The measurement of the tread length in its finished state corresponds to the measurement of the travelling length of the tread recorded by a second optical coder fastened to a roller driven in rotation and located near the aforementioned press-roller. Experience shows that this device for measurement of the travelling length of the tread during placement of the tread on the casing does not prove satisfactory, since it is not accurate, and lacks of reproducibility.

To improve the reliability of this measurement of the travelling length of the tread when placed on a casing, U.S. Pat. Des. No. 2,105,765 has proposed monitoring the movement of the free end of the tread as it travels in front of a series of photoelectric cells evenly spaced along a roller-driven feed conveyor. However, this measurement is necessarily discontinuous, and the device is expensive.

The purpose of the invention is a simple device for measurement of the travelling length of the tread during its placement on the casing, and the procedure for use thereof.

This device for measurement of the travelling length of the tread during its placement on a tire casing is characterized by the fact that it measures the movement of a stop pressed lightly against the free end of the tread.

Another feature of this embodiment is the fact that the pressure with which the stop is pressed is supplied by the action of a motor which can generate a substantially constant torque whatever is speed of rotation, even if that speed is zero.

A third feature of this embodiment lies in the fact that the stop is connected to a notched endless belt held in place by pulleys, the shaft of one of these pulleys being attached to the shaft of the motor delivering substantially constant torque.

A fourth feature of this embodiment is that the movements of this stop are measured by an optical coder fastened to the shaft of one of the pulleys holding in place the notched belt.

The invention advantageously performs the measurement of the travelling length of the tread in an area virtually free of stresses produced in tread, and thus in an area in which it is not deformed. This measurement is, therefore, directly comparable to the initial measurement of the length of the tread.

Another advantage is linked to the fact that the stop is fastened to the free end of the tread. This arrangement eliminates all possibility of respective sliding movements, as in the case of a roller driven in rotation by the advance of the tread.

The pressure with which the stop is pressed against the free end of the tread resists the friction of the various rollers, thereby enhancing the reliability of the resulting measurement.

Finally, this very simple, inexpensive device supplies a continuous measurement of the finished length of the tread, thereby allowing fine control of the elongation of the tread when the latter is installed.

The procedure disclosed by the invention entails the recapping of a tire casing by means of a pre-molded and pre-vulcanized tread, pre-cut to the desired length while adhering to the tread-design spacing and then wound on the casing, while controlling its elongation as a function of the difference between the measurement of arc of the casing where the tread is put in place and the measurement of the final length of said tread, this process being characterized by the fact that the final length of the tread is measured by monitoring the movement of a stop pressed lightly against the free end of the tread.

One special embodiment of the invention will now be described with respect to the following attached drawings.

Figure 1:
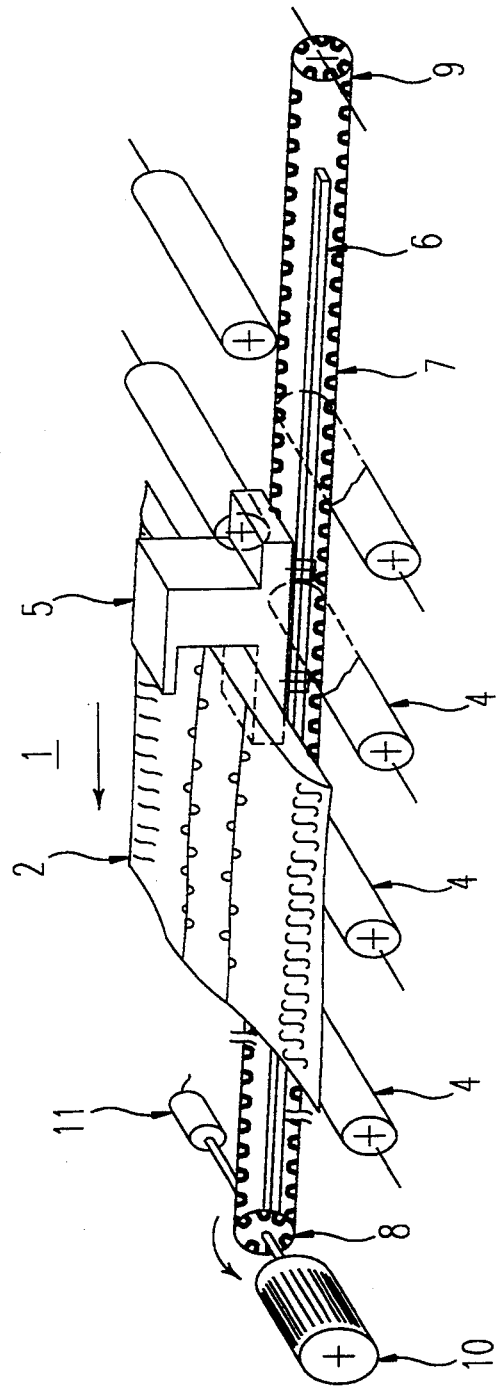
FIG. 1 is a view of the device for measurement of the travelling length of the tread.

The device 1 for measurement of the travelling length of the tread 2 during its installation on a casing 21 is incorporated into a preparation table 3 driven by rollers 4. The tread 2 placed flat on this preparation table 3 may easily moved by virtue of these rollers 4 (FIG. 1).

The device 1 for measurement comprises a stop 5 which travels freely on a guide track 6 linked to an endless notched belt 7 held in place by a driven pulley 8 and an idle pulley 9, a motor 10, and an optical coder 11. The motor 10 can supply a substantially constant torque, whatever its speed of rotation, and even a zero speed. The shafts of the motor 10 and the optical coder 11 form a single unit with that of the driven pulley 8.

During the entire phase of installation of tread on the casing, the stop 5 exerts a force of about twenty newtons on the free end of the tread, by virtue of the action of the motor 10, which is transmitted by the driven pulley 8 and the belt 7. This force is sufficient to ensure that the stop 5 will be pressed continuously on the free end of the tread 2 during the entire operation involving installation of the tread 2 on the casing 21, without causing any measurable deformation of said tread 2.

The rotation of the driven pulley 8, as recorded by the optical coder 11, is thus directly proportional to the movement of the free end of the tread, i.e., to the length of the finished tread at any moment during the operation entailing installation of the tread on the casing 21.

The measurements transmitted by this device 1, in conjunction with the measurements giving the arc of the casing 21 at the point where the tread 2 installation is completed makes it possible to satisfactorily control the conditions under which a tread 2 is installed on a tire casing 21.

Figure 2:
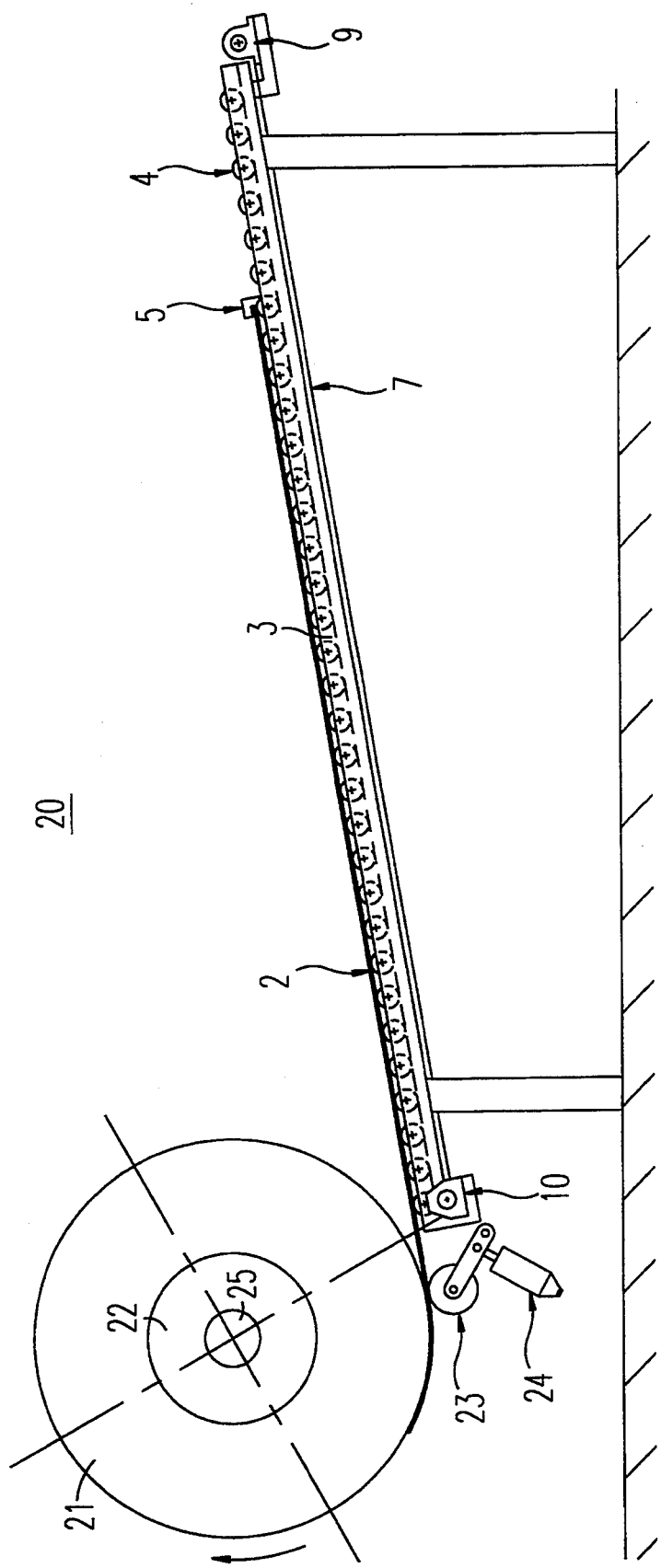
FIG. 2 is an overall diagram of the device for installing a tread on a tire casing.

The process involving recapping a tire casing 21 with a pre-molded, pre-vulcanized tread 2 makes use of the device illustrated in FIG. 2. This process follows the following steps: After removing the remaining part of the used tread by machining the casing 21, a bonding layer designed to ensure adhesion between the casing and the new tread 2 is put in place. Next, the casing 21 is mounted on the chuck 22 and inflated. The tread is then cut to a length approaching that of the circumference of casing 21, while adhering to the tread-design spacing, and is installed on a preparation table 3 with its tread design pattern against the guide rollers 4. It is prepared by applying a layer of tire cement compatible with the bonding layer. The end of the tread 2 located in proximity to the casing 21 is then engaged beneath the press-roller 23 and placed on the casing 21, tangentially to the latter. The stop 5 is pressed against the other end, and the chuck 22 is placed in rotation, thereby travelling the tread 2 around the casing 21. During this installation procedure, the application pressure generated by the jack 24 actuating the press-roller 23 is made dependent on the difference between the measurement of the length of the arc of the casing 21 over which the tread 2 has been applied, this measurement being supplied by the optical coder 25, and the measurement of the length displacement of the free end of the tread 2, as given by the device 1. At the end of the tread 2-installation procedure, the operator joins the two tread ends by applying a bonding gum, and the bonding layer and bonding gum are then cold-vulcanized or vulcanized in an autoclave.

The device and the process disclosed in the present invention may be made applicable to the recapping of all types of tires using a pre-molded, pre-vulcanized tread, while adhering to the tread-design spacing, if necessary.

We claim:

1. A method of recapping a tire casing with a pre-molded, pre-vulcanized tread pre-cut to a desired length while providing a predetermined tread-design spacing, comprising the steps of:

applying the tread to the tire casing on the chuck while elongating a length of the applied tread;

measuring an arc of the casing upon which the tread has been applied since a beginning of said applying step;

measuring a length of displacement of the free end of the tread since a beginning of said applying step by monitoring movement of a stop pressing lightly against a free end of the tread during said applying step; and controlling an elongation of the tread during said applying step as a function of a difference between a measurement of an arc of the casing upon which the tread has been applied since a beginning of said applying step and a length of displacement of the free end of the tread since a beginning of said applying step.

2. A device for the installation of a pre-molded, pre-vulcanized tread, pre-cut to a desired length, on a tire casing mounted on a chuck, said device comprising:

means for applying the tread to the tire casing on the chuck while elongating a length of the applied tread;

means for measuring an arc of the casing upon which the tread has been applied;

a stop;

means for pressing said stop lightly against a free end of the tread when applying the tread to the tire casing;

means for measuring a length of displacement of the free end of the tread when applying the tread to the tire casing by measuring a displacement of said stop; and means for controlling an elongation of the tread when applying the tread to the tire casing as a function of a difference between a measurement of an arc of the casing upon which the tread has been applied and a length of displacement of the free end of the tread when applying the tread to the tire casing.

3. The device of claim 2 wherein said pressing means comprise a constant torque motor.

4. The device of claim 3 wherein said pressing means further comprise:

a pair of pulleys, one of said pulley being mounted to an output shaft of said motor; and a notched belt mounted on said pulleys, said stop being mounted to said notched belt.

5. The device of claim 4 wherein said means for measuring a length of displacement of the free end of the tread comprise an optical coder attached to a rotational shaft of one of said pulleys.

* * * * *